United States Patent [19]

Seneker

[11] 4,267,081
[45] May 12, 1981

[54] HIGH SOLIDS POLYURETHANE COATINGS

[75] Inventor: James A. Seneker, Anaheim, Calif.

[73] Assignee: Ameron, Inc., Monterey Park, Calif.

[21] Appl. No.: 953,696

[22] Filed: Oct. 23, 1978

[51] Int. Cl.$^2$ .................... C09D 3/64; C09D 3/66; C09D 3/72
[52] U.S. Cl. .................... 260/22 TN; 260/18 TN; 260/22 R; 260/22 CB
[58] Field of Search ........... 260/22 TN, 18 TN, 22 R, 260/22 CB

[56] References Cited

U.S. PATENT DOCUMENTS

| | | | |
|---|---|---|---|
| 2,577,770 | 12/1951 | Kass et al. | 260/22R |
| 2,609,349 | 9/1952 | Cass . | |
| 2,864,780 | 12/1958 | Katz et al. | 260/18 TN |
| 3,316,189 | 4/1967 | Adams . | |
| 3,318,828 | 5/1967 | Seiner | 260/22 TN |
| 3,532,651 | 10/1970 | Wooster | 260/22 TN |
| 4,010,126 | 3/1977 | Kuzma | 260/22 CB |
| 4,014,830 | 3/1977 | Rumfield | 260/22 CB |
| 4,071,514 | 1/1978 | Ribbecke et al. | 260/22 TN |

FOREIGN PATENT DOCUMENTS

| | | | |
|---|---|---|---|
| 914414 | 1/1963 | United Kingdom | 260/18 TN |
| 952116 | 3/1964 | United Kingdom | 260/18 TN |
| 957585 | 5/1964 | United Kingdom | 260/18 TN |
| 1041467 | 9/1966 | United Kingdom | 260/18 TN |

*Primary Examiner*—Ronald W. Griffin
*Attorney, Agent, or Firm*—Christie, Parker & Hale

[57] ABSTRACT

Polyurethane resins are prepared by reacting a high solids polyol-containing component with an isocyanate-containing component. The polyol-containing component comprises the transesterification product of from about 70 to about 90 parts by weight castor oil and from about 5 to about 20 parts by weight pentaerythritol, where the solids content of the polyol-containing component is at least about 60% by weight. Preferably, the polyol-containing component also comprises from about 5 to about 30 parts by weight of a condensation agent having a molecular weight of less than about 400 and selected from the group consisting of polycarboxylic acids having up to about 4 carboxyl groups, methyl and ethyl esters of such polycarboxylic acids, and combinations thereof.

30 Claims, No Drawings

HIGH SOLIDS POLYURETHANE COATINGS

BACKGROUND

This invention relates to two-component polyurethane coatings.

Currently-available two-component aliphatic polyurethane coatings offer an attractive combination of high gloss, excellent exterior durability, adequate hardness, abrasion resistance, and flexibility, as well as resistance to organic solvents, hydraulic fluids, and various other chemicals and stains. These coatings are easy to cure, because they can be cured at ambient temperature or with mild baking.

Because of these performance properties, polyurethane coatings are currently used for:

1. High performance industrial product finishes for aircraft and other large surfaces which cannot conveniently be baked because of their physical size, and also for wood, plastic, and other substrates which would be degraded or deformed by high temperature baking;
2. Industrial maintenance finishes which must be cured at ambient temperature, but require exterior durability, and solvent and chemical resistance equivalent to those of baked coatings; and
3. Linings for pipes and storage tanks which are required to handle solvents and corrosive chemicals.

A problem with most two-component polyurethane coatings and enamels available on the market is that they are applied by spraying at a volume solids content of less than 50%. The remaining portion of the coatings consists of petroleum-derived solvents. Pollution regulations, such as the Southern California Air Pollution Control District Rule 442, severely restrict the use of such polyurethane coatings, unless equipment is installed to reduce solvent emissions by at least 85%. Such solvent control equipment is very expensive. In some cases, the use of solvent control equipment is infeasible, such as the spraying of fixed structures, like the exterior of large storage tanks. However, regulations such as Regulation 442, contain more lenient requirements for coatings containing less than 20% by volume of organic solvents.

Since federal regulations and other local air pollution laws are likely to be modeled after those already in effect in California, it would be desirable to discover a high solids urethane coating which performs satisfactorily in the three above-mentioned applications. It is desirable that such coatings have application properties, cured film performance, and cost-per-square-foot per mil dry film thickness comparable to the presently-used low solids urethane coatings.

An approach which has been considered to produce high solids polyurethane coatings is to use a low-viscosity, polyol-containing component and a low-viscosity, isocyanate-containing component for producing the polyurethane coating. However, achieving a satisfactory low-viscosity polyol for use in polyurethane coatings is a difficult problem. A technique which has been evaluated is to lower the molecular weight of the polyol-containing component by combining monomeric polyols, such as ethylene glycol, propylene glycol, neopentyl glycol, hexylene glycol, 1,6 hexanediol, decylene glycol, glycerine, trimethylol ethane, trimethylol propane, and the like. These monomeric polyols can be reacted with low-viscosity monomeric diisocyanates and can be sprayed at 100% solids content. However, the coatings formed exhibit one or more of the following deficiencies:

1. Cost: Since the diisocyanate component is the most expensive part of the formulation, and it is added at least in stoichiometric amount relative to the polyol, the use of a polyol with a low-equivalent weight per hydroxyl group results in a very expensive completed coating. The above list of polyols have equivalent weights per hydroxyl group, varying from 31 for ethylene glycol to 87 for decylene glycol, and thus yield extremely costly polyurethanes.
2. Low flexibility: For sufficient flexibility in the polyurethane coating, some linear aliphatic hydrocarbon chains should be present in the polyurethane. Of the polyols listed above, only hexylene glycol, 1,6 hexanediol, and decylene glycol meet this requirement. The other polyols yield very brittle films with poor adhesion to steel.
3. Insufficient cross-linking: Cross-linking is required in the polyurethane coating to provide solvent and chemical resistance. When a glycol or a diol is reacted with a diisocyanate, the resulting polyurethane is primarily linear in nature. To achieve good chemical and solvent resistance properties with the diisocyanate, the polyol used should have a functionality greater than 2; that is, it should contain more than two hydroxyl groups per molecule to achieve a high level of cross-linking. The polyols listed above which contain more than 2 hydroxyls-glycerine, trimethylol ethane and trimethylol propane, yield costly and brittle polyurethanes.

Therefore, there is a need for a high solids polyol-containing component for producing a low cost polyurethane coating with good application properties and good cured film performance.

SUMMARY

The present invention is directed to polyurethane resins which are formed from an isocyanate-containing component and a high solids polyol-containing component having the above features.

The polyol-containing component comprises the transesterification product of from about 70 to about 90 parts by weight castor oil and from about 5 to about 20 parts by weight pentaerythritol. The polyol-containing compound has a solids content of at least about 60% by weight, and preferably at least about 85% by weight. Such a polyol-containing compound is satisfactory for reaction with an isocyanate-containing component for preparation of tank and pipe linings.

For industrial product and maintenance finishes, preferably the high solids polyol-containing component also contains a condensation agent having a molecular weight of less than about 400 and selected from the group consisting of polycarboxylic acids having up to about 4 carboxyl groups, methyl and ethyl esters of such polycarboxylic acids, and combinations thereof.

Preferably, the polyol-containing compound has the following properties:

(a) an acid number from about 3 to about 15;
(b) an average number of hydroxyl groups per mole of from about 3 to about 7; and
(c) an equivalent weight per hydroxyl group of greater than about 200.

For high chemical and solvent resistance, preferably the polyol-containing compound comprises from about 5 to about 30 parts by weight of a vinyl-containing compound, the vinyl-containing compound comprising one or more compounds having a molecular weight of less than 200 and being selected from the group consisting of hydroxyalkylesters of α,β-unsaturated mono- and dicarboxylic acids.

To maximize the solids content of the polyurethane coating that is applied to a surface, preferably the isocyanate-containing compound consists essentially of one or more aliphatic diisocyanates of the formula OCN-R-NCO, where R is an aliphatic or cycloaliphatic group having a molecular weight of less than about 220.

These and other features, aspects, and advantages of the present invention will become better understood with reference to the appended claims and following description.

DESCRIPTION

The present invention is directed to a high solids polyol-containing component for preparation of high quality, low cost polyurethane resin coating materials. When the polyol-containing component is combined with an isocyanate-containing component, the combination has a solids content in excess of 80% by volume. The polyol-containing component comprises the transesterification product of from about 70 to about 90 parts by weight castor oil and from about 5 to about 20 parts by weight pentaerythritol, and has a solids content of at least about 60% by weight.

Castor oil, which is principally glyceryl triricinoleate, contains 3 hydroxyl groups per molecule, has a high equivalent weight per hydroxyl group, and has 3 long aliphatic hydrocarbon chains. Partially dehydrated castor oil can be used in the polyol-containing component, as long as the polyol-containing compound has an average of at least 3 hydroxyl groups per molecule.

The pentaerythritol is used in the polyol-containing component to add strength to the coating formed by reaction of the polyol-containing component with diisocyanate-containing compound. It is found that cured films made from just castor oil and diisocyanates are soft and relatively weak, probably because the long aliphatic hydrocarbon chains of the castor oil comprise too large a percentage of the final composition. It has been found that by using about 70 to about 90 parts by weight castor oil and from about 5 to about 20 parts by weight pentaerythritol in the polyol-containing component, and more preferably from about 5 to about 15 parts by weight pentaerythritol, the polyol-containing component can be used to form a high gloss, hard, and strong polyurethane coating. This is equivalent to a weight ratio of castor oil to pentaerythritol of from about 3:1 to about 20:1. At a weight ratio of less than about 3:1, and in the absence of a polybasic acid condensation agent, the polyol is not a single-phase liquid and is too high in hydroxyl number to yield economical polyurethanes. If a condensation agent is added to reduce the hydroxyl number to a reasonable value, the molecular weight and viscosity are too high for formulating truly high solids polyurethane coatings. At ratios of greater than about 20:1, the polyurethane coating formed is soft and relatively weak.

Commercially available pentaerythritol can be used, and typically contains about 88% mono-pentaerythritol and 12% dipentaerythritol, and has an average number of about 4.14 hydroxyl groups per molecule.

The polyol-containing component preferably has as high a solids content as possible subject to the limitation that it can form a sprayable composition when combined with an isocyanate-containing compound. The polyol-containing component has a solids content of at least about 60% by weight, preferably at least about 85% by weight and, if possible, contains substantially no solvent.

The transesterification product of the castor oil and pentaerythritol is formed by combining castor oil and pentaerythritol in a vessel heated to about 225° to 250° C. with agitation under a nitrogen blanket. The material is held at about 225°-250° C. until one part by volume of the product dissolves in three parts by volume hot methanol to yield a clear solution. If the solution is not clear, heating is continued, and additional catalyst can be added. Transesterification generally takes about half an hour. To achieve transesterification, an alcoholysis catalyst is used, such as 0.1 part by weight of a 50% paste of lithium ricinoleate per about 90 parts by weight reactants. Other alcoholysis catalysts which can be used include lead soap, lithium soap, and litharge (plumbous oxide).

Transesterification of raw castor oil and technical pentaerythritol is frequently performed commercially as the first step in the preparation of an alkyd resin from raw castor oil. However, it is believed that the use of such a compound as a polyol for the preparation of two-component polyurethanes has not been done.

The transesterification procedure, which is also known as alcoholysis, is described in detail by Temple C. Patton, *Alkyd Resin Technology*, Interscience Publishers, New York, 1962.

Although the transesterification product of the castor oil and pentaerythritol can be used to produce polyurethane coatings of high chemical resistance, the coating formed is relatively soft and expensive. This is because the transesterification product has a low molecular weight, which can be less than 500, and an average number of hydroxyl groups per molecule of from only about 3 to 4. The low molecular weight results in relatively soft polyurethane coating. The high cost occurs because each hydroxyl group requires an isocyanate group for formation of a polyurethane resin. The isocyanate compound is the most expensive part of the polyurethane resin, and thus only a relatively high cost polyurethane coating can be produced.

To reduce the cost of the coating and to improve its hardness, it is preferred that a condensation agent be included in the polyol-containing component. The condensation agent serves to increase the average molecular weight per hydroxyl group of the polyol-containing component and thereby lowers the cost of the product, because less isocyanate-containing compound is required to produce polyurethane resin. The condensation agent has a molecular weight of less than about 400 and is selected from the group consisting of polycarboxylic acids having up to about 4 carboxyl groups, esters of such polycarboxylic acids, and combinations thereof. From about 5 to about 30 parts by weight of the condensation agent are used. The esters of the polycarboxylic acids are chosen so that the alcohol portion of the ester boils away at the temperature used for transesterification, which is about 225° to 250° C. Therefore, generally only methyl and ethyl esters of the polycarboxylic acids are used.

Exemplary of satisfactory condensation agents are maleic anhydride, isophthalic acid, adipic acid, succinic acid, trimellitic anhydride, phthalic anhydride, sebacic acid, benzophenone tetracarboxylic dianhydride, pyromellitic dianhydride, and pyromellitic acid.

To form the condensation product of the transesterification product and the condensation agent, the condensation agent is mixed with the transesterification product at a temperature of from about 200° to 225° C. The mixture is held at this temperature for sufficient time to reduce the resin acid number of the composition to from about 3 to about 15. The resin acid number equals the milligrams of potassium hydroxide required to neutralize one gram of sample. It is necessary that the resin acid number be reduced to less than about 15, because, at higher values, carbon dioxide gas can be released when the polyol-containing component is reacted with an isocyanate-containing component. This could result in a coating containing bubbles and blisters. If the acid number is reduced to less than about 3, the polyol-containing component is a poor pigment wetter due to the lack of free carboxyl groups. In addition, at a resin acid number of less than 3, the coating formed may not have high gloss, and the coating material is a poor wetter for hydrophillic surfaces, such as steel and aluminum.

The polyol-containing component has an acid number of essentially 0 if no condensation agent is used.

The condensation product produced from castor oil, pentaerythritol, and condensation agent is similar to commercially available raw (non-dehydrated) castor alkyds. However, there are four important differences which allow the condensation product of the present invention to be used for forming high solids polyurethane coatings. With regard to the condensation product of the present invention:

1. its molecular weight is lower than that of raw castor alkyds;
2. its percentage of castor oil is higher than for most commercial alkyds;
3. the hydroxyl number is higher than that of raw castor alkyds; and
4. in most commercial alkyds, the castor oil is at least partially dehydrated.

In a particularly preferred version of the present invention, the polyol-containing component comprises from about 5 to about 30 parts by weight of a vinyl-containing component, where the vinyl-containing component comprises one or more compounds having a molecular weight of less than 200 selected from the group consisting of hydroxyalkylesters of $\alpha,\beta$-unsaturated mono- and dicarboxylic acids. The vinyl compounds added serve to reduce the viscosity of the polyol-containing component, as well as reduce the average number of hydroxyl groups per molecule of the polyol-containing component. The reduction in hydroxyl-containing components is compensated for by the vinyl functionality provided by the vinyl-containing component, which provides additional polymerization sites during the cure of the polyurethane resin.

It is expected that an isocyanate-containing component and a polyol-containing component which includes a vinyl-containing component can polymerize by any or all of the following mechanisms:

1. Hydroxyls of the condensation product of the condensation agent, castor oil, and pentaerythritol can form urethane linkages with isocyanate groups.
2. Hydroxyls of the vinyl-containing component can form urethane linkages with isocyanate groups.
3. Vinyl groups of the vinyl-containing component can vinyl-polymerize with the unsaturation in the ricinoleate group of the castor oil and pentaerythritol. In addition, if maleic anhydride is the condensation agent, vinyl groups of the vinyl-containing component can vinyl-polymerize with the maleic double-bond.
4. Oxidative polymerization can occur with the $C=C$ groups.
5. If a small amount of ricinoleate dehydration has occurred, forming conjugated unsaturation, these double-bonds can rapidly combine with double-bonds of the vinyl-containing component, or double-bonds of maleic anhydride by Diels-Alder mechanism.

Exemplary of vinyl-containing compounds which can be used are hydroxyethyl methacrylate, hydroxypropyl methacrylate, hydroxyethyl acrylate, hydroxypropyl acrylate, trimethylol propane monoacrylate, trimethylol propane diacrylate, and combinations thereof.

Preferably, at least about 5 parts by weight of a vinyl-containing component are used per 90 parts by weight castor oil containing polyol to form the polyol-containing component to achieve a significant reduction of the viscosity of the polyol-containing component. Preferably, no more than about 40 parts by weight of the vinyl-containing component are used per 60 parts by weight castor oil containing polyol, or else the coating formed from the polyol-containing component may have unsatisfactory gloss, relatively low hardness, and poor adhesion to metals.

The following criteria have developed for the polyol-containing compound:

1. It should have an average number of hydroxyl groups per molecule of from about 3 to about 7. At values of less than about 3, the polyurethane formed with the polyol-containing component can have poor chemical resistance. At values greater than about 7, it is difficult to produce a high solids coating composition, because the polyol-containing component has high viscosity.

2. A viscosity at 100% solids of less than about 100,000 centipoises.

3. An equivalent weight per hydroxyl group of greater than 200 for industrial product finishes and maintenance finishes, and from about 100 to about 200 for tank and pipe linings. Equivalent weight per hydroxyl group is determined by dividing the average molecular weight of the polyol-containing component by the average number of hydroxyl groups per molecule.

4. A hardness in cured film of at least B for exterior coatings and at least H for tank and pipe linings. Hardness is determined by pushing a pencil into a cured film and determining the hardest pencil which does not remove the film. The pencil hardness scale from the hardest to the softest is as follows:

8H, 7H, 6H, 5H, 4H, 3H, 2H, H, HB, F, B, 2B, 3B, 4B, 5B, 6B.

5. A GE reverse impact in the cured film of at least 2% for industrial product finishes and maintenance finishes and at least ½% for tank and pipe linings. GE impact-flexibility is determined using FTMS 141a, Method 6226.

6. The polyol-containing component has a sufficiently low viscosity that when it is sprayed with an isocyanate-containing component, the mixture has a viscosity of less than about 500 centiposes at the spray temperature. Preferably, ambient temperature spraying is used, but, if necessary, the mixture can be heated before spraying.

The isocyanate-containing component preferably consists essentially of one monomeric diisocyanates so that the combination of the polyol-containing component and the isocyanate-containing component has a low viscosity. Diisocyanates employed in the practice of the present invention have the formula, OCN—R—NCO, where R is a divalent organic radical, for example, alkylene, arylene, alkarylene, aralkylene, etc., as well as other similar divalent organic radicals containing substituents thereon. Among such diisocyanates are ethylene diisocyanate, decamethylene diisocyanate, hexamethylene diisocyanate, tetramethylene diisocyanate, butylene 1,3-diisocyanate, propylene 1,2-diisocyanate, ethylidene diisocyanate, cyclopentylene 1,3-diisocyanate, cyclohexylene 1,3-diisocyanate, 1-methylphenylene 2,4-diisocyanate, diphenyl 4,4'-diisocyanate, toluene diisocyanate, isophorone diisocyanate, etc.

To minimize the viscosity of the combined isocyanate-and polyol-containing components, preferably the isocyanate-containing component consists essentially of one or more aliphatic diisocyanates, where R is an aliphatic alkyl group having a molecular weight of less than about 220. High quality polyurethanes have been prepared from the above-described polyol-containing components when they were reacted with 4,4'-(methylene bis(cyclohexylisocyanate)).

For commercial use, the polyol-containing component is provided in a first package, and the isocyanate-containing component is provided in a second package. The two components are combined, and then are applied to a substrate to be coated. Application can be done by conventional techniques, including spraying the combination onto the surface, or application by brush. The coating can be applied at ambient temperature, or, if desired to reduce viscosity or to have a higher solids content, heating can be used.

In addition to the components described above, either or both the isocyanate-containing component and the polyol-containing component can contain catalysts, accelerators, fillers, thixotropic agents, lubricating agents, ultraviolet absorbents, antioxidants, solvents, and other compounds commonly used with polyurethane resins. For example, the polyol-containing component can contain catalysts such as those described in U.S. Pat. No. 3,084,177. To add lubricity and minimize cratering and pigment flooding, methyl silicone oil can be included in the polyol-containing component. To avoid sagging of the composition when applied to a vertical surface, hydrogenated castor solids can be included in the polyol-containing component.

Small amounts of solvent can be added to the polyol-containing component. However, as little solvent as possible should be added, so that the combined polyol-containing component and the isocyanate-containing component have a solids content of at least about 80% by volume. Exemplary of solvents which can be used are hexylene glycol, cellosolve acetate, xylene, toluene, and methylethylketone (MEK).

It is possible to apply a high solids polyurethane coating of the present invention to a vertical surface by adding a thixotropic agent, such as colloidal silica, to a polyol-containing component as described above. It has been found that colloidal silica in an amount of only up to about 3% by weight of the combined polyol- and isocyanate-containing components can be added, or elase the coating produced exhibits some "orange peel" effect.

Another compound which can be added to the polyol- or isocyanate-containing component is a pot life extender. For example, $\alpha$, $\gamma$-diketones having at least 3 carbon atoms are useful for chelating tin catalysts. A preferred pot life extender is 2,4-pentanedione. The pot life extender can be used as all or part of the solvent used for dilution of the polyol-containing component.

It can be desirable to add one or more fillers to either the polyol-containing component or the isocyanate-containing component. Among the fillers useful in the practice of this invention are talc, silica, alumina, carbon particles, steel chips, steel filings, aluminum flake, calcium carbonate, titanium dioxide and other pigments, fibrous fillers, such as asbestos and chopped glass, barytes, and various other fillers commonly employed with polyurethanes.

The polyurethane coatings produced according to the present invention have many substantial advantages. They are useful as high performance industrial product finishes, industrial maintenance finishes, and linings for pipes and storage tanks. They show resistance to a wide variety of chemicals and solvents, as well as good weatherability. The application properties, cured film performance, and cost are comparable to those of presently-used, low solids urethane coatings. In spite of the high solids content of the coatings of the present invention, they can be applied to vertical surfaces in thick coats without an orange peel effect.

Another advantage of coatings of the present invention is that they use aliphatic diisocyanates instead of the higher viscosity and more costly tri- or polyisocyanates. In addition, the polyol portion of the composition is lower in viscosity than commercially available alkyds and polyesters. Furthermore, by use of a vinyl-containing compound, polymerization mechanisms in addition to urethane formation are available.

Another advantage of the present invention stems from the fact that the coating materials provided have a high solids content. Therefore, conservation of valuable petroleum-derived solvents is realized. Because the coatings of the present invention have a low solvent content, less solvent is evaporated during application, and air pollution is minimized.

These and other features of the present invention are demonstrated by the following examples and controls.

EXAMPLE 1

(Preparation of Polyol)

Six polyol-containing components, 1A, 1B, 1C, 1D, 1E, and 1F, were prepared in accordance with the principles of the present invention. The ingredients of each of the six polyol-containing components are presented in Table 1. The components were prepared by loading Part I (castor oil, pentaerythritol, and lithium ricinoleate) into a 5-liter, round bottom, 3-neck flask equipped with heating mantle, agitator, nitrogen inlet tube, thermometer, and condenser. Part I was heated under a nitrogen blanket with agitation to 250° C., and held at that temperature until a 1 milliliter sample dissolved in 3 milliliters of methanol was clear. At this stage, composition 1F was complete. For compositions 1A-1E, the contents of the flask were cooled to 200° C., and the Part II component was added. The mixture was heated to 200° C. for composition 1A, and 225° C. for compositions 1B, 1C, 1D, and 1E, and held at this elevated temperature while samples were taken at 1-hour intervals. When the resin acid number dropped to a value of from about 5 to about 7, the preferred range, the batch was cooled and filled into suitable containers.

The water loss reported in Table 1 occurred due to the condensation reaction which occurred after the addition of the condensation agent (Part II).

The hydroxyl number, percent hydroxyl by weight, equivalent weight per hydroxyl group, percent ricinoleate nucleus, average hydroxyl groups per mole, average molecular weight, resin acid number, viscosity, and weight per gallon of each of the six polyol-containing components are presented in Table 1.

method of combining the ingredients are presented in Table 2. In all cases, the isocyanate component was 4,4′-(methylene bis(cyclohexylisocyanate)). The polyol component and the isocyanate component were mixed together and applied to a surface to form a protective polyurethane coating. Coatings 2A–2E are satisfactory for use as high performance industrial product finishes and industrial maintenance finishes. Coating 2F is satisfactory as a lining for pipe and storage tanks. Because

TABLE 1

| POLYOL COMP. NO. | 1A | 1B | 1C | 1D | 1E | 1F |
|---|---|---|---|---|---|---|
| PART I (parts by weight) | | | | | | |
| Castor Oil[(1)] | 80.51 | 77.30 | 78.60 | 77.75 | 86.15 | 82.93 |
| Technical Pentaerythritol | 12.53 | 11.93 | 12.13 | 12.00 | 6.65 | 17.07 |
| Lithium Ricinoleate (50% paste) | (0.10) | (0.10) | (0.10) | (0.10) | (0.10) | (0.10) |
| PART II (parts by weight) | | | | | | |
| Maleic Anhydride | 8.53 | — | — | — | — | — |
| Isophthalic Acid | — | 13.75 | — | — | — | — |
| Adipic Acid | — | — | 12.30 | — | — | — |
| Succinic Acid | — | — | — | 12.50 | — | — |
| Trimellitic Anhydride | — | — | — | — | 8.86 | — |
|  | 101.57 | 102.98 | 103.03 | 102.25 | 101.66 | 100.00 |
| Minus water loss | 1.57 | 2.98 | 3.03 | 2.25 | 1.66 | none |
| Total | 100.00 | 100.00 | 100.00 | 100.00 | 100.00 | 100.00 |
| Hydroxyl No. (calc. @ 0 acid No.) | 250.96 | 232.4 | 242.9 | 193.5 | 107.2 | 424.9 |
| % Hydroxyl by weight | 7.60 | 7.04 | 7.36 | 6.21 | 3.25 | 12.87 |
| Equiv. Wt/Hydroxyl | 223.5 | 241.4 | 230.9 | 289.9 | 523.2 | 132.0 |
| Ricinoleate Nucleus (% of total) | 72.85 | 69.94 | 71.12 | 70.35 | 77.95 | 75.04 |
| Average OH's/Mole | 5 | 5 | 5 | 5 | 7 | 3.65 |
| Average Molecular Wt. | 1118 | 1207 | 1155 | 1450 | 3662 | 482 |
| Resin Acid No. | 6 | 5.3,7.1 | 5.4 | 4.0 | 5.1 | 0 |
| Visc. @ 25° C.(stokes) | 225 | 165;190 | 58 | >250 | 110 | |
| Weight/Gallon (lbs) | 8.53 | 8.51;8.56 | 8.38 | 8.45 | 8.34 | |

[(1)]Spencer Kellogg #1225 or NL Industries' AA castor oil.

EXAMPLE 2

(Preparation of Coating Formulations)

Six coatings formulations, 2A, 2B, 2C, 2D, 2E, and 2F, were prepared using the six polyol components prepared as described in Example 1. These coating compositions were prepared by combining a polyol-containing component with an isocyanate-containing component. The ingredients of the polyol-containing component, the amount of each ingredient used, and the coating 2F contains a higher proportion of isocyanate components than coatings 2A–2E, it is the most expensive of the six coatings.

For each coating formulation, Table 2 presents the isocyanate to hydroxyl mole ratio, the viscosity of the polyol component, the viscosity of the combined polyol and isocyanate components, the weight per gallon of the polyol component, and the solids of the combined polyol and isocyanate component (by weight and by volume).

TABLE 2

| Coating Composition | 2A | 2B | 2C | 2D | 2E | 2F |
|---|---|---|---|---|---|---|
| Polyol Component (pbw)* | | | | | | |
| Titanium dioxide | 40.00 | 40.00 | 40.00 | 40.00 | 40.00 | — |
| MPA 60 (xylene)[(1)] | 1.00 | 1.00 | 1.00 | 1.00 | 1.00 | — |
| Polyol #1A | 22.39 | — | — | — | — | — |
| Polyol #1B | — | 22.50 | — | — | — | — |
| Polyol #1C | — | — | 22.50 | — | — | — |
| Polyol #1D | — | — | — | 22.50 | — | — |
| Polyol #1E | — | — | — | — | 22.50 | — |
| Polyol #1F | — | — | — | — | — | 39.66 |
| 1% GE-SF69 in toluene[(2)] | 0.40 | 0.40 | 0.40 | 0.40 | 0.80 | — |
| Hydroxyethyl Methacrylate | 5.54 | — | — | — | — | — |
| Hexylene Glycol | — | — | — | — | 5.08 | — |
| Cellosolve Acetate | — | 3.00 | 3.00 | 3.00 | — | — |
| Batch sand mill for 7 minutes (to 140° F. minimum) ⟶ | | | | | | |
| Hydroxyethyl Methacrylate | 1.50 | — | — | — | — | — |
| Hexylene Glycol | 2.93 | — | — | — | — | — |
| Polyol #1B | — | 12.30 | — | — | — | — |
| Polyol #1C | — | — | 11.68 | — | — | — |
| Polyol #1D | — | — | — | 14.84 | — | — |
| Polyol #1E | — | — | — | — | 9.61 | — |
| Methyl Ethyl Ketone | 4.00 | — | — | — | 3.60 | — |
| Drain mill, then wash sand with ⟶ | | | | | | |

TABLE 2-continued

| Coating Composition | 2A | 2B | 2C | 2D | 2E | 2F |
|---|---|---|---|---|---|---|
| Methyl Ethyl Ketone | 4.00 | 6.00 | 6.00 | 6.00 | 4.00 | — |
| Drain mill, then wash sand with | → | → | → | → | → | |
| Methyl Ethyl Ketone add | 4.00 | 3.00 | 3.00 | 3.00 | 4.00 | — |
| Thermolite 31[4] | Hold out | → | → | → | → | 0.87 |
| Isocyanate Component (pbw) | | | | | | |
| Hylene W[3] | 26.24 | 23.80 | 24.42 | 21.26 | 27.25 | 59.47 |
| | 112.00 | 112.00 | 112.00 | 112.00 | 117.84 | 100.00 |
| NCO/OH Mole Ratio | 1.0 | 1.25 | 1.25 | 1.25 | 1.4 | 1.5 |
| Visc. of Polyol Comp. | | | | | | |
| Stormer (Krebs Units) | 66 | 73 | 77 | 129 | 69 | |
| #4 Ford | 38.6" | 158" | 141" | 670" | 80.1" | |
| Visc. of Polyol + Isocyanate Comp. | | | | | | |
| Zahn #2 | 23" | | | | | 47.4" |
| Weight/Gallon of Polyol Comp. (lbs.) | 11.41 | 12.20 | 12.04 | 12.51 | 11.13 | |
| Solids of Polyol + Isocyanate Comp. | | | | | | |
| by weight (%) | 88.25 | 88.25 | 88.25 | 88.25 | 88.84 | |
| by volume (%) | 80.16 | 80.80 | | 80.58 | 81.65 | |

*parts by weight
[1]24% by weight hydrogenated castor solids in 76% by weight xylene from Baker Castor Oil, Division of NL Industries
[2]methyl silicone oil
[3]4,4'-(methylene bis(cyclohexylisocyanate)) comp.
[4]tin mercaptan from M&T Inc. The amount used was adjusted to give the desired catalyzed viscosity stability and cure time. See Table 4.

EXAMPLE 3

(Preparation of Coating Formulations)

Four coating formulations, 3A, 3B, 3C, and 3D, were prepared using polyol components 1A and 1B prepared as described in Example 1. These coating compositions were prepared by combining a polyol-containing component with an isocyanate-containing component. The ingredients of the polyol-containing component, the amount of each ingredient used, and the method of combining the ingredients are presented in Table 3. In all cases, the isocyanate component was 4,4'-(methylene bis(cyclohexylisocyanate)). The polyol component and the isocyanate component were mixed together and applied to a surface to form a protective polyurethane coating. Coatings 3A–3D are satisfactory for use as high performance industrial product finishes and industrial maintenance finishes.

For each coating formulation, Table 3 presents the isocyanate to hydroxyl mole ratio, percent by weight tin catalyst added, and the solids of the combined polyol and isocyanate component (by weight annd by volume).

TABLE 3

| | 3A | 3B | 3C | 3D |
|---|---|---|---|---|
| Polyol Component (pbw) | | | | |
| Titanium dioxide | 40.00 | 40.00 | 40.00 | 40.00 |
| MPA 60 (xylene)[1] | 1.00 | 1.00 | 1.00 | 1.00 |
| Polyol #1A | 22.39 | — | 22.39 | — |
| Polyol #1B | — | 34.80 | — | 34.80 |
| 1% GE-SF69 in toluene[2] | 0.40 | 0.40 | 0.40 | 0.40 |
| Hydroxyethyl Methacrylate | 5.54 | — | 5.54 | — |
| Batch sand mill for 7 minutes [to 140° F. minimum] | | | | |
| Hydroxyethyl Methacrylate | 1.50 | — | 1.50 | — |
| Drain mill, then wash with | | | | |
| Hexylene Glycol | 2.93 | — | 2.93 | — |
| Drain mill, then add | | | | |
| Methyl Ethyl Ketone | 12.00 | 12.00 | 12.00 | 12.00 |
| Thermolite 31[4] | 0.17 | 0.17 | 0.83 | 1.39 |
| Isocyanate Component (pbw) | | | | |

TABLE 3-continued

| | 3A | 3B | 3C | 3D |
|---|---|---|---|---|
| Hylene W[3] | 26.24 | 23.80 | 26.24 | 23.80 |
| | 112.17 | 112.17 | 112.83 | 113.39 |
| NCO/OH Ratio | 1.0 | 1.25 | 1.0 | 1.25 |
| % tin added [by % wt.] | 0.03 | 0.03 | 0.15 | 0.25 |
| Solids of Polyol + Isocyanate Comp. | | | | |
| by weight [%] | 88.27 | 88.27 | 88.34 | 88.39 |
| by volume [%2] | 80.20 | 80.83 | 80.18 | 81.08 |

[1]24% by weight hydrogenated castor solids in 76% by weight xylene from Baker Castor Oil, Division of NL Industries
[2]methyl silicone oil
[3]4,4'-(methylene bis(cyclohexylisocyanate)) comp.
[4]tin mercaptan from M&T Inc.

EXAMPLE 4

(Testing of Coating 2A)

Coating formulation 2A as presented in Table 2 was cured with six different levels of tin catalyst to yield six coating formulations, 4A, 4B, 4C, 4D, 4E, and 4F. The six different levels of tin catalyst used are presented in Table 4.

Each of the compositions 4A–4F was sprayed on cold rolled steel "D" panels. Each composition was cured at at least two different schedules, which are reported in Table 4. For each applied coating, the dried film thickness, hardness of the coating, GE reverse impact, and resistance to softening with toluene are presented in Table 4. Toluene resistance was measured by wiping the coating with a towel moist with toluene. One wipe involves a wipe to the left and a wipe to the right. For example, with regard to coating 4C, in one test it was applied to panels and cured for 15 minutes at 125° C., and in another test it was cured for 15 minutes at 100° C. The coatings cured at 100° C. had a dried film thickness of from 1.9 to 2.25 mils, a Sward hardness of 25, a pencil hardness of B-HB, a GE reverse impact of 60%, and exhibited softening and slight dulling when wiped with toluene.

TABLE 4

| Example | 4A | 4B | 4C | 4D | 4E | 4F |
|---|---|---|---|---|---|---|
| Coating Type 2A (pbw) | 112.0 | 112.0 | 112.0 | 112.0 | 112.0 | 112.0 |
| Thermolite 31[1] (pbw) | 0.059 | 0.17 | 0.33 | 0.56 | 0.83 | 1.11 |
| Tin added (% by wt.) | 0.01 | 0.03 | 0.06 | 0.10 | 0.15 | 0.20 |
| Cure | | | | | | |
| 15 minutes @ 150° C. | | | | | | |
| D.F.T.[2] | 1.65–2.05 | 2.0–2.55 | | | | |
| Hardness (Sward) | 50 | 60 | | | | |
| (Pencil) | H | H-2H | | | | |
| GE Reverse Impact | 60% | 60% | | | | |
| Toluene (50 wipes)[3] | S | Sl. S. | | | | |
| 15 minutes @ 125° C. | | | | | | |
| D.F.T. | 1.5–2.3 | 1.8–2.1 | 1.9–2.4 | | | |
| Hardness (Sward) | 14 | 22 | 39 | | | |
| (Pencil) | 2B | B-HB | H | | | |
| GE Reverse Impact | 60% | 60% | 60% | | | |
| Toluene (50 wipes) | S | S | S | | | |
| 15 minutes @ 100° C. | | | | | | |
| D.F.T. | | 1.75–2.1 | 1.9–2.25 | 1.8–2.45 | | |
| Hardness (Sward) | | 12 | 25 | 30 | | |
| (Pencil) | | 2B | B-HB | F | | |
| GE Reverse Impact | | 60% | 60% | 40–60% | | |
| Toluene (50 wipes) | | S + D | S + Sl.D. | S | | |
| 15 minutes @ 75° C. | | | | | | |
| D.F.T. | | | | 2.05–2.4 | 1.8–2.25 | 1.85–2.25 |
| Hardness (Sward) | | | | 15 | 24 | 26 |
| (Pencil) | | | | B | B | B-HB |
| GE Reverse Impact | | | | 60% | 20–60% | 10–60% |
| Toluene (50 wipes) | | | | S + Sl.D. | S | S |
| Overnight @ 23° C. | | | | | | |
| D.F.T. | | | | 2.15–2.55 | 2.1–2.4 | 1.95–2.15 |
| Hardness (Sward) | | | | 28 | 31 | 31 |
| (Pencil) | | | | HB-F | H | H |
| GE Reverse Impact | | | | 5% | 5% | 2% |
| Toluene (50 wipes) | | | | S + Sl.D. | S | S |
| The visual gloss of all panels was high. | | | | | | |

[1] Tin mercaptan from M&T Inc.
[2] D.F.T. = dry film thickness in mils (or inches × 10⁻³)
[3] S = softening; D = dulling; Sl = Slight

EXAMPLE 5

(Testing of Coatings vs. Controls)

Coating formulations 3A and 3B of Example 3 were sprayed on panels and cured at 150° C. for 15 minutes. Coating compositions 3C and 3D of Example 3 were applied to panels and cured for 7 days under ambient conditions. As controls, two commercially available polyurethanes and one commercially available epoxy were also applied to panels and cured for 7 days at ambient conditions. The three control coatings are identified in Table 5.

All seven coatings were subjected to tests to determine the resistance to staining by various compounds, as well as their chemical, solvent, and weathering resistance. The results of the tests are presented in Table 5.

The weatherability of the coatings was determined in a weatherometer test where the coatings were subjected at 140° F. to 17 minutes of ultraviolet radiation, followed by 3 minutes with water spray. The lower the color change value reported in Table 5, the better the coating's resistance to weathering.

Comparison of the results of the tests reported in Table 5 for coatings 3A–3D to the results of the tests for the three control coatings leads to the conclusion that high solids coatings of the present invention have performance characteristics comparable to performance characteristics of commercially available low solids coatings. Depending on the particular test, coatings of the present invention can be better than the control coatings or vice versa.

TABLE 5

Evaluation of high solids polyurethanes vs. commercial coatings:

| COATING TYPE | 3A | 3B | 3C | 3D | CONTROLS ENMAR[5] 574-556 | AMERON[5] 2119 | AMERON[6] 85 |
|---|---|---|---|---|---|---|---|
| Cure Schedule | 15 minutes @ 150° C. | | | | 7 days air dry | | |
| Stain (4 days contact)[1] | | | | | | | |
| Mustard | 3 | 4 | 4 | 4 | 0(blist) | 0 | 8 |
| Iodine | 10 | 10 | 7 | 8 | 10 | 4 | 8 |
| Crisco | 0 | 0 | 0 | 0 | 0 | 0 | 1 |
| Felt Pen | 3 | 3 | 2 | 2 | 1 | 2 | 3 |
| Merthiolate | 0 | 0 | 0 | 0 | 0 | 0 | 10 |
| Immersion Resistance | | | | | | | |
| Primer used | None | None | (7) | (7) | (7) | (7) | (7) |
| Initial Hardness | H | H | H | H | H | H | 2H |
| +7 days immersion in: | | | | | | | |
| Skydrol[8] | 3B | 5B | Stripped | Stripped | Stripped | Stripped | 3B |
| Xylene | H | H[2] | Stripped | Stripped | 3B | 3B(Sl.) | Stripped |

TABLE 5-continued

Evaluation of high solids polyurethanes vs. commercial coatings:

| COATING TYPE | 3A | 3B | 3C | 3D | ENMAR[5] 574-556 | CONTROLS AMERON[5] 2119 | AMERON[6] 85 |
|---|---|---|---|---|---|---|---|
| MEK | 2B | Stripped | Stripped | Stripped | Stripped | strip.) Stripped | Stripped |
| Dist. Water | H | H | B | H | 3B | B | H |
| 5% NaCl | — | (2) | (3) | (3) | (3) | (3) | — |
| 1% NH$_4$OH | B[2] | B[3] | B[2] | (3) | (3) | (3) | B |
| SO$_2$ Atmosphere | OK | (3) | (3) | (3) | (3) | (3) | OK |
| Spot Tests (4 days contact)[4] | | | | | | | |
| 20% NaOH | Tr.D | Tr.D | Med.D | Tr.D | NE | NE | Tr. + D |
| 20% HNO$_3$ | (3) | (3) | (3) | (3) | (3) | (3) | Med.St. |
| 20% HCl | Tr.D | (3) | Med.D | (3) | (3) | (3) | NE |
| 20% Acetic Acid | (3) | (3) | (3) | (3) | (3) | (3) | Tr.D |
| 5% NaOCl | NE | NE | NE | NE | NE | Med.Bl. | Med.Dk. |
| 5% H$_2$SO$_4$ | NE | NE | NE | NE | NE | (3) | Bad Bl. |
| Weatherometer | | | | | | | |
| Gloss (initial) | 89.0 | 85.4 | 90.3 | 91.5 | 92.6 | 63.3 | — |
| (+500 hrs) | 89.5 | 77.6 | 89.3 | 69.4 | 88.6 | 68.4 | — |
| Color change | 1.1 | 1.2 | 0.9 | 1.2 | 2.7 | 1.7 | — |

[1]0 = no effect; 10 = extreme staining
[2]Poor adhesion
[3]Blistering
[4]D = dulling; Bl = blush; St = stain; NE = no effect; Tr = trace; Med = medium; Dk = darkening
[5]Commercially available polyurethane enamels based on hydroxy modified acrylic resins cross-linked with an aliphatic isocyanate. They both contain less than 60% by volume solids. [6]Commercially available amine adduct-cured epoxy enamel. It contains less than 60% by volume solids.
[7]Polyamide cured epoxy polymer
[8]Phosphate ester sold by Monsanto as a hydraulic fluid

EXAMPLE 6
(Testing of Coating)

Polyol 1F of Example 1 was tested to determine if it was satisfactory for use as interior coating for tanks and pipes. A formulation containing polyol 1F was prepared and is described in Table 6. The composition was applied to cold rolled steel D panels and cured for 16 hours at 140° F. The properties of the film are presented in Table 6.

The formulation was also coated on glass slides, which were then immersed in various reagents for 24 hours. The results of this test are also presented in Table 6. The results presented in Table 6 show that polyol 1F can be used to make a satisfactory coating for interior surfaces of tanks and pipes.

TABLE 6

| | |
|---|---|
| Polyol 1F | 34.80 |
| GE-SF69[1] (1% in toluene) | 1.00 |
| MEK | 19.00 |
| Mondur MRS[2] | 45.20 |
| | 100.00 |
| NCO/OH Ratio | 1.3/1 |
| Nonvolatile by weight | 80% |

| Cured properties on cold-rolled steel D panels: | |
|---|---|
| Curing Schedule | 16 hrs. @ 140° F. |
| Dry Film Thickness | 2.4 mils |
| Hardness (Sward) | 66 |
| (Pencil) | B |
| Cross Scratch Adhesion | 100% |
| GE Reverse Impact | 2% |
| Toluene Resistance (50 wipes) | Satisfactory |

| Cured properties on glass slides immersed in various reagents for 24 hrs: | |
|---|---|
| Acetone @ 50° C. | Satisfactory |
| 20% Sodium Hydroxide @ 93° C. | Satisfactory |
| Glacial Acetic Acid @ 93° C. | Satisfactory |
| Acetaldehyde @ 4° C. | Satisfactory |

[1]Methyl silicone Oil
[2]About 50% diphenylmethane diisocyanate and about 50% higher polymers of similar structure from Mobay Chemical Company Although this invention has been described in considerable detail with reference to certain versions thereof, other versions are possible. For example, it may be possible to replace all or a portion of the pentaerythritol with styrene allyl alcohol polymers, low molecular weight epoxy resins, sorbitol, polyalkylene ether polyols, and combinations thereof.

Suitable styrene allyl alcohol polymers are those of the formula:

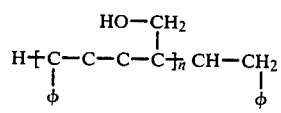

where n is from 3 to about 7. If n is greater than 7, the polymer is too viscous for high solids coating. If n is less than about 3, there is insufficient cross-linking for a coating having good chemical and solvent resistance. Such polymers can have molecular weights of from about 1700 to about 2400, and can contain from about 5 to about 8 percent by weight hydroxyl groups. Such polymers are available from Monsanto Chemical Co. under the trade designations of RJ100 and RJ101.

Suitable low molecular weight epoxy resins are those containing from about 3 to about 6 hydroxyl groups. They can be prepared by the reaction of epichlorohydrin with bisphenol A.

Because of variations such as these, the spirit and scope of the appended claims should not necessarily be limited to the description of the preferred versions contained herein.

What is claimed is:
1. A high solids polyol-containing component for reaction with an isocyanate-containing component for preparation of polyurethane resins, the polyol-containing component comprising the condensation product of:
(a) from about 70 to about 90 parts by weight castor oil;

(b) from about 5 to about 20 parts by weight pentaerythritol; and (c) from about 5 to about 30 parts by weight of a condensation agent having a molecular weight of less than about 400 and selected from the group consisting of polycarboxylic acids having up to about 4 carboxyl groups, methyl and ethyl esters of such polycarboxylic acids, and combinations thereof, wherein the solids content of the polyol-containing component is at least about 60% by weight, and the component has an average of at least 3 hydroxyl groups per molecule.

2. A polyol-containing component as defined in claim 1 which has a solids content of at least about 85% by weight.

3. A polyol-containing component as defined in claim 2 which contains substantially no solvent.

4. A polyol-containing component as defined in claim 1 which has an acid number of from about 0 to about 15.

5. A polyol-containing component as defined in claim 4 having an acid number of at least about 3.

6. A polyol-containing component as defined in claim 1 in which the condensation agent is selected from the group consisting of maleic anhydride, isophthalic acid, adipic acid, succinic acid, trimellitic anhydride, phthalic anhydride, and sebacic acid.

7. A polyol-containing component as defined in claim 1 comprising the condensation product of castor oil, the condensation agent, and from about 5 to about 15 parts by weight pentaerythritol.

8. A polyol-containing component as defined in claim 1 which has an average number of hydroxyl groups per molecule of from about 3 to about 7.

9. A polyol-containing component as defined in claim 8 in which the castor oil is partially dehydrated.

10. A polyol-containing component as defined in claim 1 in which the pentaerythritol comprises mono- and dipentaerythritol.

11. A polyol-containing component as defined in claim 1 which has an equivalent weight per hydroxyl group of greater than about 200.

12. A polyol-containing component as defined in claim 1 further comprising from about 5 to about 30 parts by weight of a vinyl-containing component, the vinyl-containing component comprising one or more compounds having a molecular weight of less than 200 and being selected from the group consisting of hydroxyalkylesters of ethylenically α,β-unsaturated mono- and dicarboxylic acids.

13. A polyol-containing component as defined in claim 12 in which the vinyl-containing component is selected from the group consisting of hydroxyethyl methacrylate, hydroxypropyl methacrylate, hydroxyethyl acrylate, hydroxypropyl acrylate, trimethylol propane monoacrylate, trimethylol propane diacrylate, and combinations thereof.

14. A high solids polyol-containing component for reaction with an isocyanate-containing component for preparation of polyurethane resins, the polyol-containing component comprising the condensation product of:

(a) from about 70 to about 90 parts by weight castor oil;

(b) from about 5 to about 15 parts by weight pentaerythritol; and (c) from about 5 to about 30 parts by weight of a condensation agent having a molecular weight of less than about 300 and selected from the group consisting of polycarboxylic acids having up to about 4 carboxyl groups, methyl and ethyl esters of such polycarboxylic acids, and combinations thereof, wherein the polyol-containing component has a solids content of at least about 85% by weight, an acid number of from about 3 to about 15, an average number of hydroxyl groups per molecule of from about 3 to about 7, and an equivalent weight per hydroxyl group of greater than 200.

15. A polyol-containing component as defined in claim 14 which contains substantially no solvent.

16. A polyol-containing component as defined in claim 14 in which the condensation agent is selected from the group consisting of maleic anhydride, isophthalic acid, adipic acid, succinic acid, trimellitic anhydride, phthalic anhydride, and sebacic acid.

17. A polyol-containing component as defined in claim 14 further comprising from about 5 to about 30 parts by weight of a vinyl-containing component, the vinyl-containing component comprising one or more compounds having a molecular weight of less than 200 and being selected from the group consisting of hydroxyalkylesters of ethylenically α,β-unsaturated mono- and dicarboxylic acids.

18. A polyol-containing component as defined in claim 17 in which the vinyl-containing component is selected from the group consisting of hydroxyethyl methacrylate, hydroxypropyl methacrylate, hydroxyethyl acrylate, hydroxypropyl acrylate, trimethylol propane monoacrylate, trimethylol propane diacrylate, and combinations thereof.

19. A method for producing polyurethane resins comprising the step of reacting at least one diisocyanate-containing component with a high solids polyol-containing component, the polyol-containing component comprising the transesterification product of from about 70 to about 90 parts by weight castor oil and from about 5 to about 20 parts by weight pentaerythritol, wherein the solids content of the polyol-containing component is at least about 80% by weight, and the component has an average of at least three hydroxyl groups per molecule.

20. The method of claim 19 in which the polyol-containing component has an acid number less than 1.

21. A method as claimed in claim 19 in which the polyol-containing component comprises from about 5 to about 30 parts by weight of a vinyl-containing component, the vinyl-containing component further comprising one or more compounds having a molecular weight of less than 200 and being selected from the group consisting of hydroxyalkylesters of ethylenically α,β-unsaturated mono- and dicarboxylic acids.

22. The method of claim 21 in which the vinyl-containing component is selected from the group consisting of hydroxyethyl methacrylate, hydroxypropyl methacrylate, hydroxyethyl acrylate, hydroxypropyl arcylate, trimethylol propane monoacrylate, trimethylol propane diacrylate, and combinations thereof.

23. The method of claim 19 in which the diisocyanate portion of the diisocyanate-containing component consists essentially of one or more aliphatic diisocyanates of the formula OCN-R-NCO, where R is an aliphatic alkyl group having a molecular weight of less than about 220.

24. The method of claim 19 in which the aliphatic diisocyanate compound is 4,4'-(methylene bis(cyclohexylisocyanate)).

25. The method of claim 19 in which at least part of the diisocyanate portion is an aromatic polyisocyanate.

26. A method for producing polyurethane resins comprising the step of reacting at least one diisocyanate-containing component with a polyol-containing component as defined in claim 1, 3, 6, 12, 13 or 14.

27. The method of claim 26 in which the diisocyanate portion of the diisocyanate-containing component consists essentially of one or more aliphatic diisocyanates of the formula OCN-R-NCO, where R is an aliphatic or cycloaliphatic group having a molecular weight of less then about 220.

28. The method of claim 27 in which the aliphatic diisocyanate compound is 4,4'-(methylene bis(cyclohexylisocyanate)).

29. A polyurethane resin prepared by the method defined in claim 19.

30. A polyurethane resin prepared by the method defined in claim 26.

* * * * *

UNITED STATES PATENT AND TRADEMARK OFFICE
CERTIFICATE OF CORRECTION

PATENT NO. : 4,267,081
DATED : May 12, 1981
INVENTOR(S) : JAMES A. SENEKER

It is certified that error appears in the above—identified patent and that said Letters Patent is hereby corrected as shown below:

Col. 1, line 41, after "tions" insert a comma
Col. 3, line 68, "compound" should read -- component --
Col. 6, line 68, "one" should read -- only --
Col. 9, line 33 (Table I), "5.3,7.1" should read -- 5.3;7.1 --
Col. 11, line 51, "annd" should read -- and --

Signed and Sealed this

Thirtieth Day of March 1982

[SEAL]

Attest:

GERALD J. MOSSINGHOFF

*Attesting Officer*  *Commissioner of Patents and Trademarks*